(12) United States Patent
Yi et al.

(10) Patent No.: US 8,134,938 B2
(45) Date of Patent: Mar. 13, 2012

(54) DELAY CONTROL IN A MOBILE COMMUNICATION SYSTEM

(75) Inventors: Byung K. Yi, San Diego, CA (US);
Young C. Yoon, San Diego, CA (US);
Li-Hsiang Sun, San Diego, CA (US);
Shu Wang, San Diego, CA (US); Sang G. Kim, San Diego, CA (US)

(73) Assignee: LG Electronics, Seoul (KR)

( * ) Notice: Subject to any disclaimer, the term of this patent is extended or adjusted under 35 U.S.C. 154(b) by 978 days.

(21) Appl. No.: 12/118,536

(22) Filed: May 9, 2008

(65) Prior Publication Data
US 2009/0016268 A1 Jan. 15, 2009

Related U.S. Application Data

(60) Provisional application No. 60/917,042, filed on May 9, 2007, provisional application No. 61/036,414, filed on Mar. 13, 2008.

(51) Int. Cl.
*H04J 1/16* (2006.01)
*H04J 3/14* (2006.01)
*H04W 24/02* (2009.01)
*H04W 72/04* (2009.01)

(52) U.S. Cl. ........ 370/255; 370/329; 370/330; 370/350; 370/436; 370/503; 370/254; 455/503

(58) Field of Classification Search ............... 370/254, 370/255, 328, 324, 329, 330, 338, 436, 437, 370/350, 477, 478, 503, 510, 913, 508; 375/260, 375/267, 346, 348; 455/18, 67.16, 101, 450, 452.1, 452.2, 502, 503
See application file for complete search history.

(56) References Cited

U.S. PATENT DOCUMENTS

| | | | |
|---|---|---|---|
| 2001/0021179 A1* | 9/2001 | Tiedemann et al. | 370/333 |
| 2005/0147026 A1 | 7/2005 | Jones et al. | |
| 2006/0193268 A1* | 8/2006 | Walton et al. | 370/264 |
| 2006/0198344 A1* | 9/2006 | Teague et al. | 370/337 |
| 2007/0002726 A1 | 1/2007 | Zangi | |
| 2007/0171853 A1* | 7/2007 | Jones et al. | 370/328 |
| 2008/0014918 A1* | 1/2008 | Ito et al. | 455/423 |
| 2010/0265968 A1* | 10/2010 | Baldemair et al. | 370/503 |

FOREIGN PATENT DOCUMENTS

KR 10-2005-0103099 10/2005
WO WO 98/32242 * 7/1998

* cited by examiner

*Primary Examiner* — Chi Pham
*Assistant Examiner* — Ahmed Elallam
(74) *Attorney, Agent, or Firm* — Lee, Hong, Degerman, Kang & Waimey

(57) ABSTRACT

The present invention is related to controlling delay in a wireless communication system. The present invention includes receiving a signal from a plurality of base stations, measuring at least one signal delay of each of the plurality of base stations, reporting the measured at least one signal delay of each base station to a controller controlling the plurality of base stations, and receiving an adjusted signal from each of the plurality of base stations as a result of reporting the measured at least one signal delay, wherein each adjusted signal is received in a synchronous manner.

8 Claims, 13 Drawing Sheets

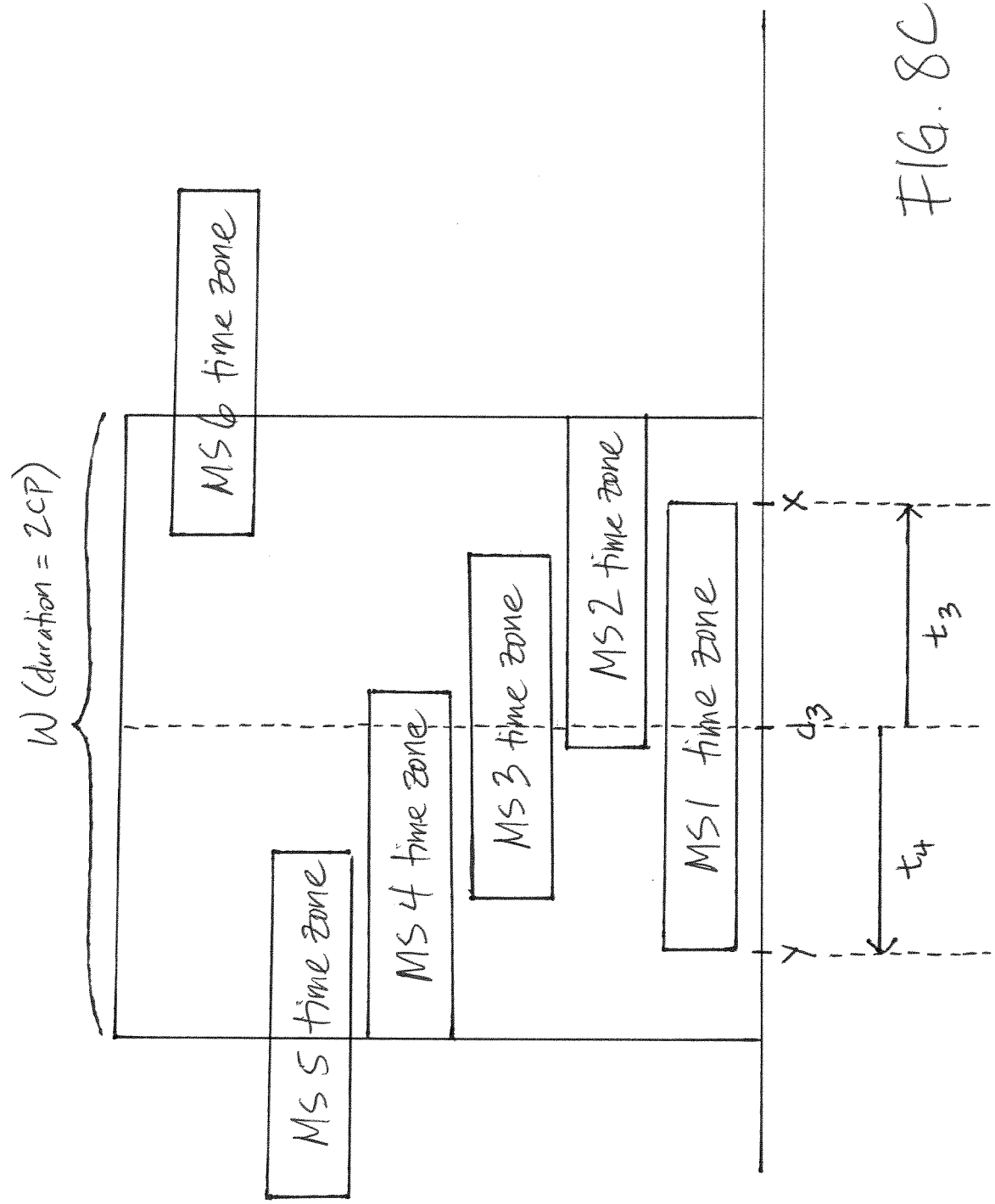

DELAY CONTROL IN A MOBILE COMMUNICATION SYSTEM

CROSS-REFERENCE TO RELATED APPLICATIONS

Pursuant to 35 U.S.C. §119, this application claims the benefit of earlier filing date and right of priority to U.S. Provisional Application No. 60/917,042, filed on May 9, 2007 and U.S. Provisional Application No. 61/036,414, filed on Mar. 13, 2008, the contents of which are hereby incorporated by reference herein in their entirety.

FIELD OF THE INVENTION

The present disclosure relates generally to mobile communication networks, and more particularly to a system and method for improving performance of a mobile communication network by controlling the transmission timing between network nodes to compensate for channel propagation delay between the nodes.

BACKGROUND OF THE INVENTION

Ultra Mobile Broadband (UMB) combines the best aspects of CDMA, TDM, Layer Superposed (LS)-OFDM, OFDM, and OFDMA into a single air interface using sophisticated control and signaling mechanisms and advanced antenna techniques in order to deliver ultra-high fixed and mobile broadband performance.

UMB supports a forward link up to 288 Mbps and a reverse link up to 75 Mbps while mobile and an average network latency of 16.8 msec. Furthermore, voice over IP (VoIP) of more than 500 simultaneous users over 10 MHz is facilitated while mobile. Moreover, UMB will enable the convergence of IP-based voice, broadband data, multimedia, information technology, entertainment and consumer electronic services.

UMB can efficiently support OFDMA MAC/Physical and fully support centralized as well as distributed access networks. Inter-access network interfaces are streamlined and fast layer 2 handoff is supported with seamless handoff across air interface revision boundaries.

FIG. 1 illustrates a UMB centralized access network support. As illustrated in FIG. 1, each mobile station or access terminal (AT) maintains a separate protocol stack for each access network (AN) in the active set, with each protocol stack called a "route." Furthermore each base station controller (BSC) is a separate AN.

FIG. 2 illustrates a UMB distributed access network. As illustrated in FIG. 2, each AT in this network arrangement maintains a separate protocol stack for each AN in the active set and each cell is a separate AN.

UMB simplifies the inter-AN interface by requiring each AT to support multiple routes. A simpler inter-eBS interface leads to standardized, inter-operable implementations.

Each eBS in the active set uses a separate data route and there is no need to transfer RLP and header compression states between eBSs. Traffic flowing between an eBS and an AT can be tunneled through the serving eBS, thereby supporting fast and seamless re-pointing between cells.

Signaling messages of protocols between an eBS and an AT can be tunneled through the serving eBS. No eBS has to maintain a connection state of other eBSs in the active set.

UMB layering also reduces the number of protocols in the data path. FIG. 3 illustrates UMB layers in which the application layer provides a signaling application, IP, RoHC, EAP and inter-technology tunneling. The radio link layer provides RLP and associated protocols. The MAC layer provides a packet consolidation protocol and control of physical layer channels. The physical layer defines characteristics of air interface channels. The security functions are protocols for ciphering, message integrity, and key exchange. The route control plane controls the creation and maintenance of air interface protocol stacks, one for each eBS. The session control plane provides session negotiation. The connection control plane controls the connection between the AT and an eBS.

In mobile communication systems, a base station may send to a mobile station timing adjust commands in response to an access probe. In an asynchronous mode, the base station adjusts the mobile station timing at both call set-up and handoffs. In a synchronous mode, however, the base station is able to adjust the mobile station timing, only at call set-up.

To communicate with stationary nodes in a communication network, a timing adjust command may be transmitted to maintain alignment of OFDM symbols in the reverse link (RL) (i.e., communication from the stationary node to the base station) among all the nodes in a sector or cell. However, for mobile stations (i.e., non-stationary nodes), such alignments may not be maintained in RL OFDM due to their mobility.

Generally, a mobile station's timing is affected by twice the value of the propagation delay to account for the RL propagation delay from the mobile station back to the base station. The mobile stations in a network use the same system time, offset by the forward link (FL) (i.e., communication from the base station to the mobile station) propagation delay from the base station to the mobile station. System time is synchronous to coordinated universal time (i.e., UTC time) and uses the same time origin as global positioning system (GPS) time.

Accordingly, all base stations use the same system time within a small error tolerance. Mobile stations, in contrast, use the same system time offset by the propagation delay from the base station to the mobile station. When a mobile station is located close to a base station, as the mobile station moves towards the edge of a cell (i.e., cell-edge) and as the propagation delay increases, the mobile station timing becomes delayed relative to those of other mobile stations because the mobile station's system time is offset by the network system time due to the FL propagation delay.

For example, if a base station to cell-edge distance is 1.25 km, a propagation delay change of $(2*1250 \text{ m}/(3.0\text{e}+08 \text{ m/s}))$ 8.3 micro-seconds may result. Such a propagation delay exceeds the cyclic prefix (CP) duration of 6.51 micro-seconds. Cyclic prefix is a repeat of the end of a symbol at the beginning of a subsequent transmission to allow multipath to settle before the main data arrives at the receiver. Unfortunately, due to multipath delays, the above-noted change in timing is typically exacerbated in networks employing fractional frequency reuse where the coverage extends beyond the cell radius into neighboring cells, and areas having great cell-site to cell-site distances. In such cases, to maintain alignment, the base station would need to be able to send a timing adjust or advance command to the mobile station.

Further, when a mobile station located at the cell-edge, as the mobile station moves towards the base station the propagation delay decreases. As a result, the mobile station timing advances relative to those of other mobile stations. In such a case, to maintain alignment, the base station would need to be able to send a timing adjust delay command to the mobile station. The current systems and communication networks do not adequately address this need.

Systems and methods are needed to overcome the above-noted problems.

SUMMARY OF THE INVENTION

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In one embodiment, a method for controlling delay in a wireless communication system is provided. The method comprises a mobile station receiving a signal from a plurality of base stations; the mobile station measuring at least one signal delay for each of the plurality of base stations; and reporting the measured signal delay for each base station to a controller controlling the plurality of base stations.

The mobile station may receive an adjusted signal from each of the plurality of base stations as a result of reporting the measured signal delay. Desirably, each adjusted signal is received synchronously. In certain embodiments, the adjusted signal comprises an adjusted cyclic prefix length. A portion of the adjusted signal may comprise a truncated symbol duration or an idle time in between consecutive symbols.

A base station or controller may be configured to control delay in a wireless communication system by transmitting at least one signal to a plurality of mobile stations, wherein the signal is transmitted from two base stations, respectively, with an adjusted timing offset and/or adjusted cyclic prefix. The controller may receive a report from each of the plurality of mobile stations that includes data related to measured signal delay of the two base stations transmitting a signal to a respective mobile station.

Desirably, the controller may determine a time zone for each mobile station based on the received reports. The controller may also determine a cyclic prefix length and a timing offset between the two base stations based on the received reports. Depending on implementation a report may include one or more parameters such as a delay spread of a first base station; a delay spread of a second base station; a difference between an endpoint of the first base station's delay spread and a start point of the second base station's delay spread, and other timing information.

Based on the above parameters or timing information, the controller may select a set of mobile stations that can be served simultaneously by the two base stations according to, for example, the time zone of each mobile station, the determined cyclic prefix length, and the timing offset between the two base stations. In one embodiment, the controller may adjust the cyclic prefix length of a signal transmitted to the set of mobile stations in order to simultaneously serve the set of mobile stations by way of the two base stations.

In some embodiments, one or more mobile stations may receive a signal from a base station, and measure at least one signal delay for the base station. Each mobile station may report the signal delay to the base station and in response receive an adjusted signal from the base station. The signal may be adjusted with a conservative cyclic prefix chosen by the base station according to the measured signal delay from the mobile stations waiting for data to be received in the adjusted signal.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIGS. 8A-8C illustrate a method for determining whether mobile stations can coexist in the same OFDM symbol as a reference mobile station in accordance with one embodiment of the present invention.

DETAILED DESCRIPTION OF THE PREFERRED EMBODIMENTS

Frequency division multiplexing (FDM) is utilized to transmit multiple signals simultaneously over a single transmission path, in a wireless system. Each signal travels within its own unique frequency range (carrier), which is modulated by the data (text, voice, video, etc.). In one embodiment, an orthogonal FDM's (OFDM) spread spectrum technique is used to distribute the data over a large number of carriers that are spaced apart at precise frequencies.

The spacing provides the orthogonality in this technique which prevents the demodulators from seeing frequencies other than their own. Utilization of OFDM for data communication in a wireless network results in high spectral efficiency, resiliency to RF interference, and lower multi-path distortion. OFDM is particularly useful in a terrestrial broadcasting scenario where there are multipath-channels. That is, when the transmitted signal arrives at the receiver using various paths of different length.

Multiple versions of the same signal may interfere with each other when received by the same receiver with a delay spread/offset greater than a cyclic prefix (CP) duration resulting in inter-symbol interference (ISI) and inter-carrier interference (ICI), making it difficult to extract the information originally transmitted. To resolve this problem, in one or more embodiments, delay controls and feedbacks related to systems with OFDM modulation are utilized as provided in further detail below.

In one embodiment, multiple data sources (e.g., base stations) may communicate with a mobile station over the forward link (FL) channel. Each base station or sector serves a mobile station and adjusts the transmission timing (e.g. adjusts the symbol duration of a first symbol in a packet) and the lengths of cyclic prefix of subsequent symbols, such that the OFDM symbols sent from the base stations arrive at a target mobile station synchronously. In the reverse link (RL), the RL sector or base station issues the timing adjustment commands to one or more mobile stations, such that the OFDM symbols arrive at the serving base station synchronously.

Accordingly, when signals carrying the same content from different sources arrive at a receiver, the sum of different delayed signals may have a different power profile. By controlling the delays and phases of the signals, the output signal power can be maximized. In addition, transmitters adaptively adjust symbol duration and FFT size based on the receiver's speed. The coherence time can be determined by observing the power control bits received. Depending on implementation, the receiver may be embedded in a mobile station, a base station, a relay station receiver. Further, a source may mean any of the following, without limitation: a transmitting antenna in a multi-antenna system, a base station, a mobile station, a relay stations or any combination thereof.

Figure 1:
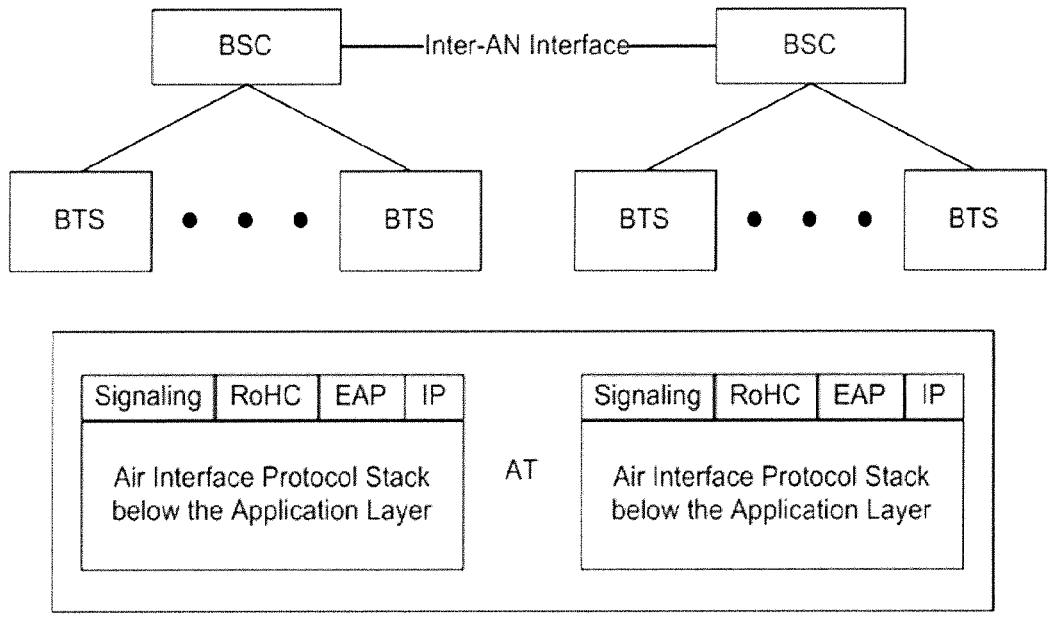
FIG. 1 illustrates a UMB centralized access network.
Figure 2:
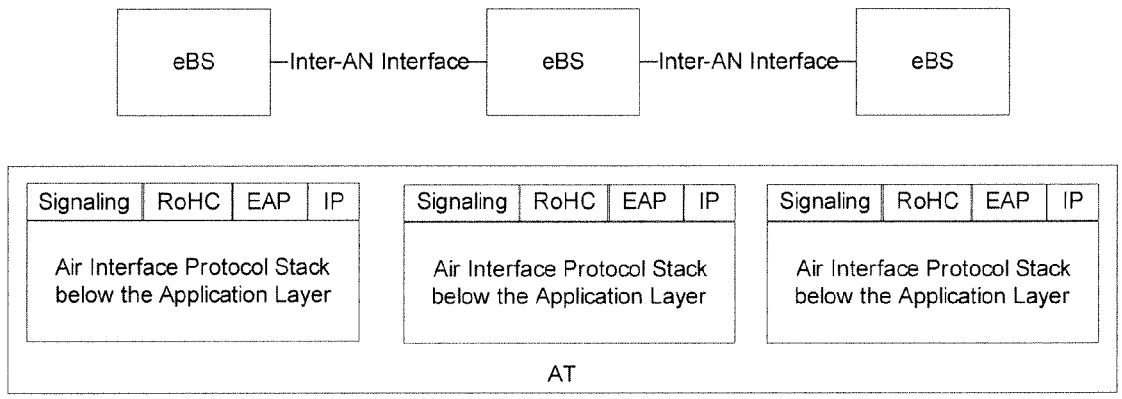
FIG. 2 illustrates a UMB distributed access network.
Figure 3:
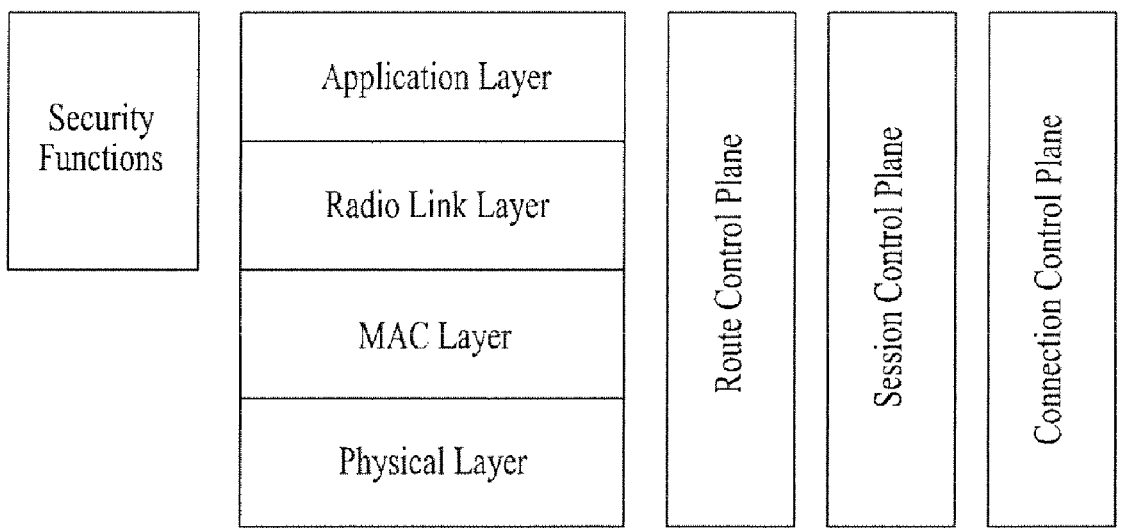
FIG. 3 illustrates UMB layers in which the application layer provides a signaling application, IP, RoHC, EAP and inter-technology tunneling.
Figure 4:
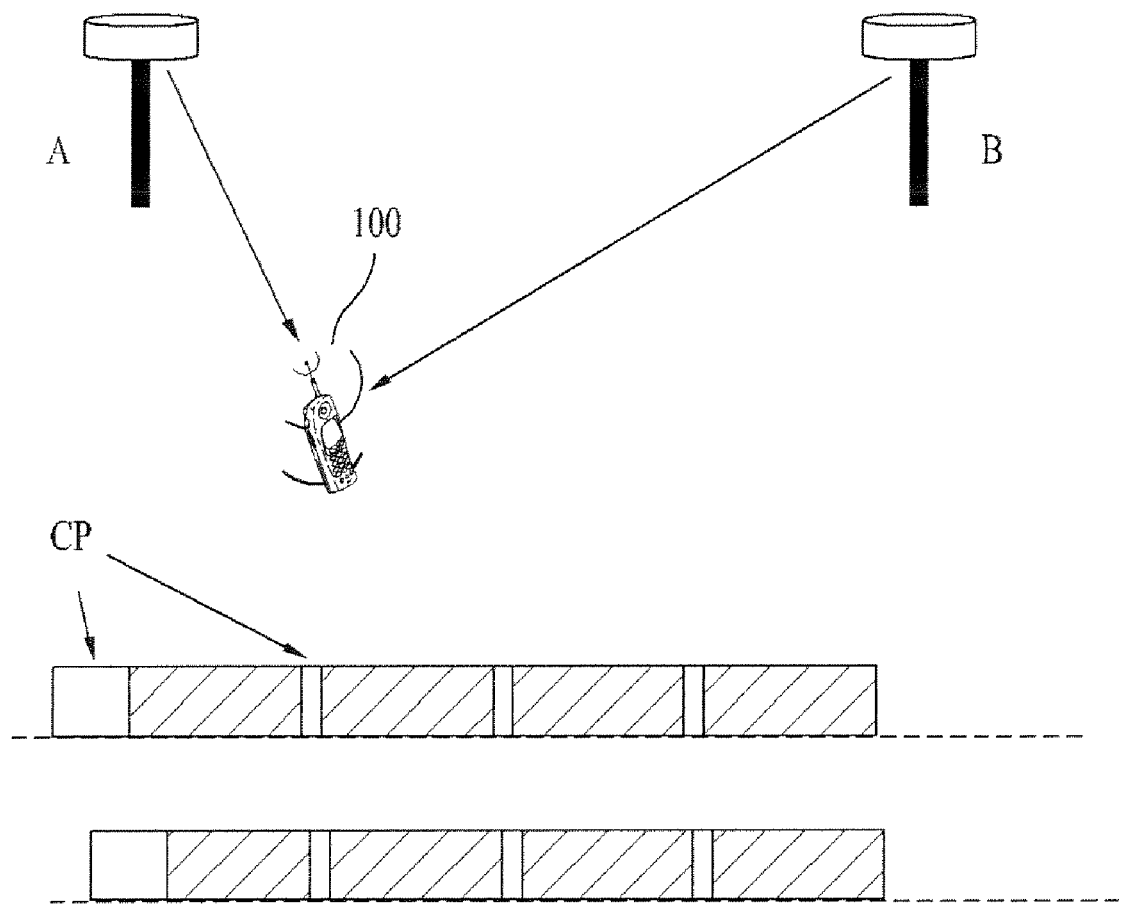
FIG. 4 illustrates an exemplary communication environment, in accordance with one embodiment, wherein a plurality of base stations are in communication with a mobile station over forward link (FL) channels.

Referring to FIG. 4, an exemplary communication environment, in accordance with one embodiment is illustrated, wherein a plurality of base stations (e.g., A and B) are in communication with a mobile station 100 over forward link channels. In one embodiment, the delay may be controlled by mobile station 100 measuring the signal delay for each of the base stations A and B, in response to receiving a signal from each of the base stations A and B. The mobile station 100 may then report the measured signal delay for each base station A or B to a controller (not shown) for the base stations A and B.

The mobile station 100 may receive an adjusted signal from each of the base stations A and B as a result of reporting the measured signal delay. Desirably, each adjusted signal is received synchronously. In certain embodiments, the adjusted signal comprises an adjusted cyclic prefix length. A portion of the adjusted signal may comprise a truncated symbol duration or an idle time in between consecutive symbols, depending on implementation.

In some embodiments, a controller or a base station may control the delay by transmitting a signal to mobile station 100, and in response receive a report related to a measured signal delay for each base station A or B transmitting a signal to the mobile station 100. The controller may then coordinate with each base station A or B to adjust the signal in view of the report received from the mobile station 100. The adjusted signal may be transmitted to the mobile station 100 such that the adjusted signal arrives at the mobile station 100 synchronously with the adjusted signal transmitted by each base station A or B.

Mobile station 100 may listen to N base stations or sectors at the same time. The same data may be transmitted from N base stations with STC, or different data may be transmitted from N base station on the same tones by spatial multiplexing. Alternatively, different data may be received from N base stations on different tones. In one embodiment, mobile station 100 measures the relative delays of the signals from each FL serving base station by observing the respective pilot signals, for example. The mobile station 100 reports the relative delay for each base station. When a packet is scheduled to be sent to the mobile station 100, the first symbols are sent with a conservative cyclic prefix.

In one embodiment, referring to FIG. 4, for a base station with non-minimum delay, the symbol duration is shortened based on the reported relative delay, such that the symbol transition times of the signals from different base stations, perceived by the mobile station 100 are approximately synchronized. In one embodiment, each base station sends the second and the following symbols in the packet with a less conservative cyclic prefix (CP) which takes into account multi-path delay spreads. The CP, in some embodiments, may be configured to be the same among all base stations.

Accordingly, due to the shortened CP from the second symbol and beyond, the overall symbol duration may be shortened. This may increase the FL data rate. In some embodiments, instead of changing the delay, phase control can be used. For example, when a repeater is used with base station 100, the base station 100 can delay its transmission by the fiber propagation delay, so the delay spread of signal received at the mobile station 100 is reduced. The base station transmitter may adjust the transmission instances or frequency to maximize the received SNR while minimizing CP length, as noted above.

Figure 5:
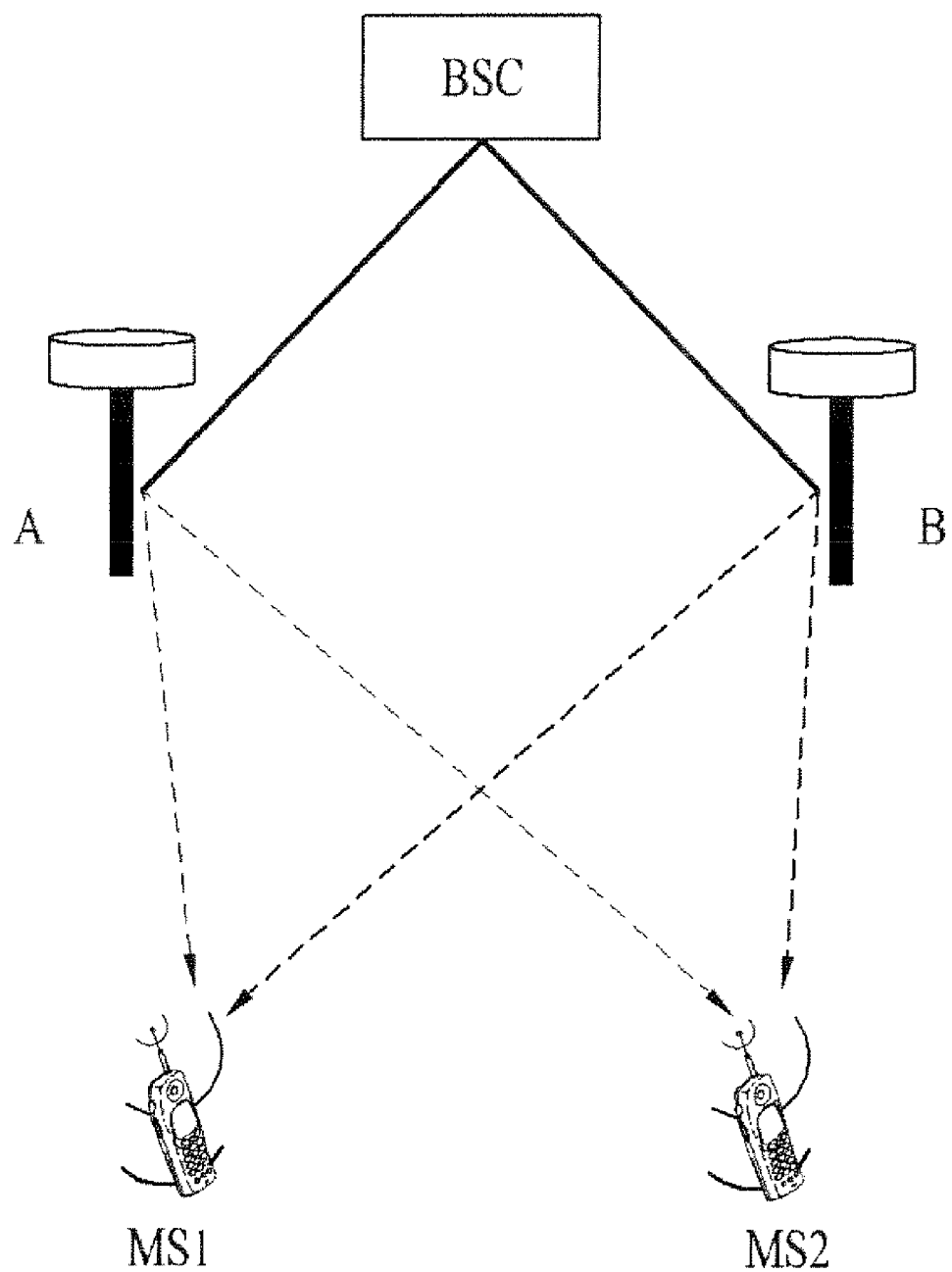
FIG. 5 illustrates an exemplary communication environment, in accordance with one embodiment, wherein a plurality of base stations are in communication with a plurality of mobile stations over forward link (FL) channels.

In accordance with another embodiment, a mobile station may be served by a plurality of base stations in the forward link (FL). Referring to FIG. 5, for example, mobile station 1 (MS1) may desire base station B (B) to be time advanced, or base station A (A) to be delayed in order to align symbol boundaries of signals received from A and B. Similarly, mobile station 2 (MS2) may desire A to be time advanced, or B to be delayed in order to align symbol boundaries of the signals received from A and B. In accordance with the present invention, a base station controller (BSC) may determine that the MS1 and MS2 can coexist in the same OFDM symbol given a certain CP size. Moreover, the BSC can determine a timing offset that satisfies both MS1 and MS2.

Figure 6:
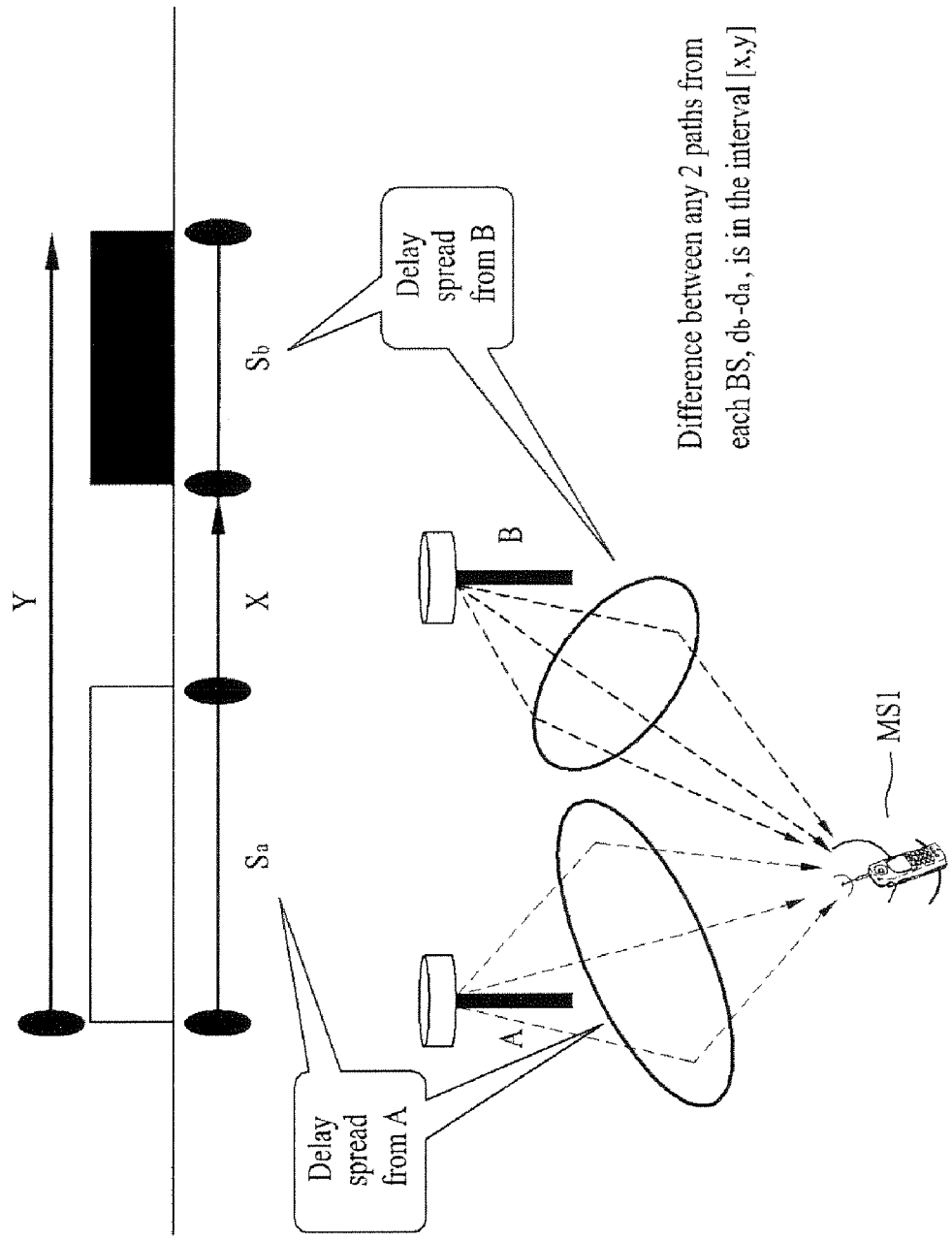
FIG. 6 illustrates a delay spread observed by a mobile station from two base stations communicating with the mobile station in accordance with one embodiment of the present invention.
Figure 7:
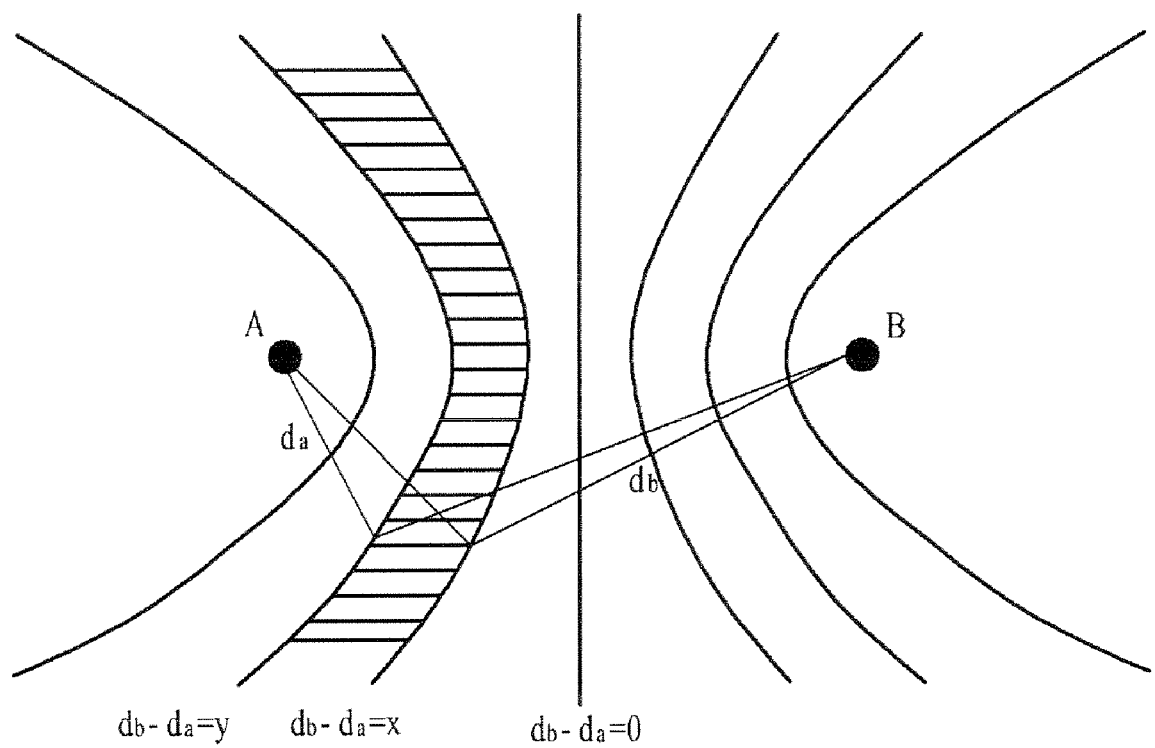
FIG. 7 illustrates a time zone of a mobile station with regard to two base stations communicating with the mobile station in accordance with one embodiment of the present invention.

Referring to FIGS. 6 and 7, a delay spread from A to mobile station 1 (MS1) is identified as $S_a$ and a delay spread from B to MS1 is identified as $S_b$. Accordingly, a difference ($d_b-d_a$) between any two paths from each base station A and B, respectively, is in the interval [x, y], wherein x is an offset from A's last delay component to B's first delay component and y is an offset from A's first delay component to B's last delay component. Moreover, a timing offset d may be applied between base stations A and B.

When the timing offset d is applied between the base stations, MS1 is in a time zone [x−d, y−d]. Accordingly, an overall delay spread S from both base stations A and B observed by MS1 is S=max {|x−d|, |y−d|, $S_a$, $S_b$}. Preferably, S is less than or equal to a cyclic prefix (CP) length for avoiding inter-symbol and inter-carrier interference. Preferably, d is defined as an advance adjustment of base station B, or a delay adjustment of base station A. Furthermore, it may be determined whether other mobile stations can be scheduled in the same OFDM symbol as MS1.

Figure 8A:
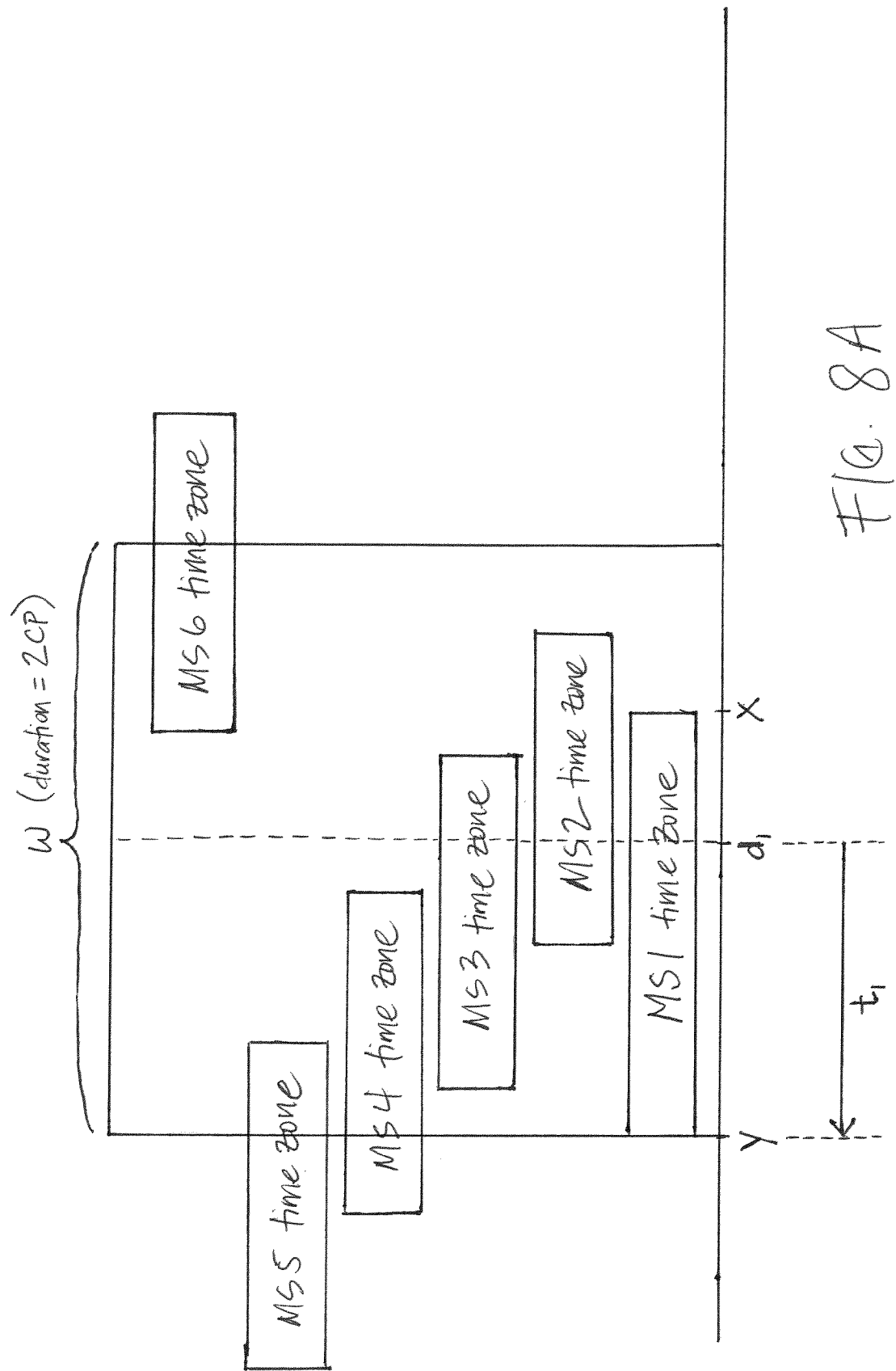
Figure 8B:
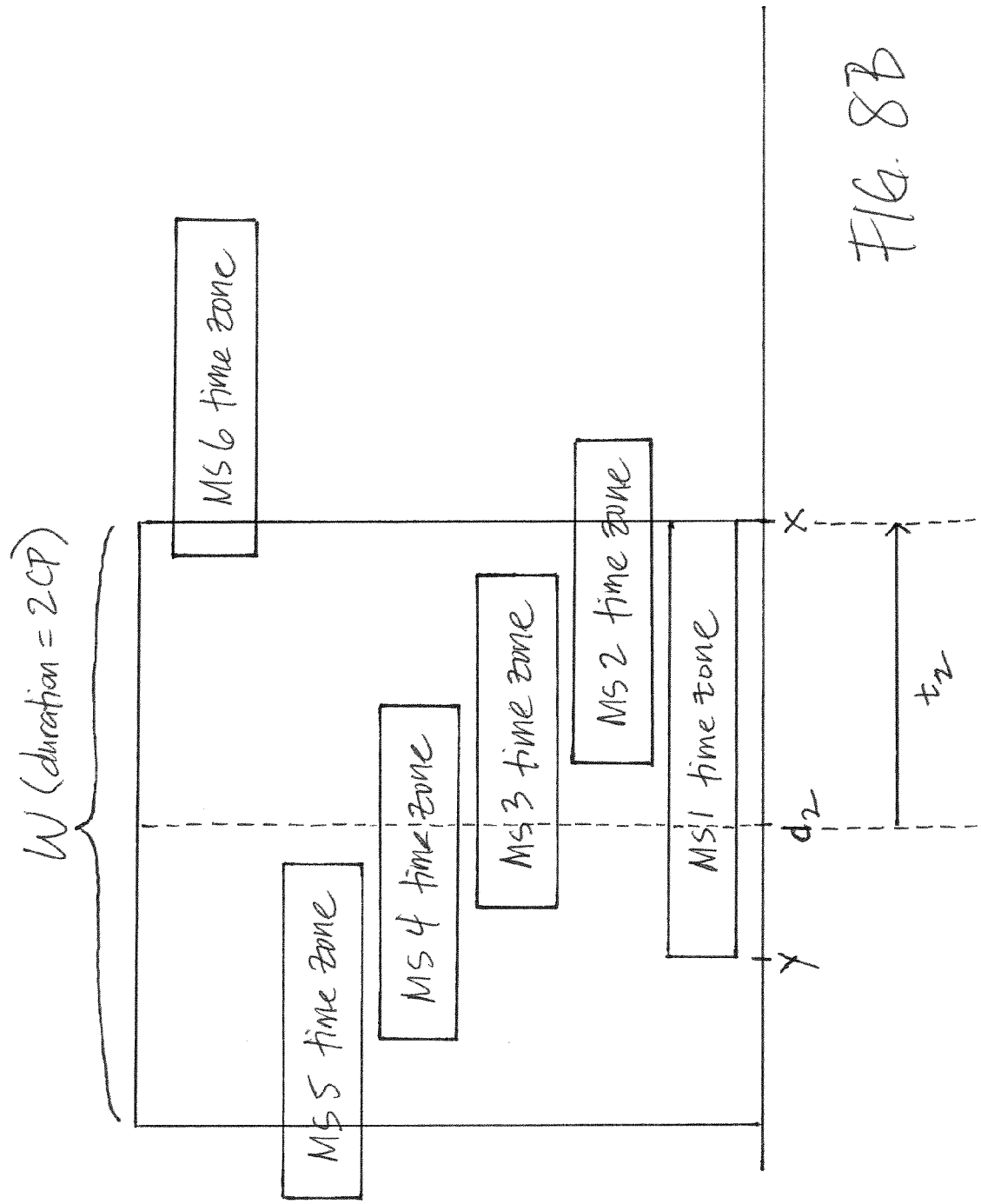

FIGS. 8A-8C illustrate a method for determining whether mobile stations can coexist in the same OFDM symbol as a reference mobile station in accordance with one embodiment of the present invention. Referring to FIGS. 8A-8C, time zone periods for mobile stations MS1 through MS6 are plotted on an axis. Here, it is assumed that CP is greater than or equal to a per sector delay spread for every mobile station MS1 through MS6 (CP≧max {$S_a$, $S_b$} for every mobile station). Accordingly, by superimposing a window w having a duration of 2 CP centered at 0, it can be determined for each mobile station whether the condition S≦CP is satisfied without timing adjustment from the base stations. That is, without base station timing adjustments, it can be determined which mobile stations can be served simultaneously by an OFDM symbol with cyclic prefix length CP. Moreover, the window w can be shifted along the axis according to different values of the timing offset d in order to determine which mobile stations can coexist with the MS1 at a respective d value.

In the example shown in FIG. 8A, a window w is superimposed on the plot such that a value of the timing offset $d_1$ is at the center of the window w. A length from the center of the window w to the farthest edge of the MS1 time zone is $t_1$, wherein $t_1$ is at or within an edge of the window w. Accordingly, an overall delay spread S observed by MS1 is given by S=max {$t_1$, $S_a$, $S_b$}. Hence, S is equal to $t_1$, which is equal to CP in FIG. 8A. Moreover, because the time zones for mobile stations MS2 and MS3 are entirely within the edges of the window w, it is determined that MS2 and MS3 can be scheduled together with MS1.

In the example shown in FIG. 8B, a window w is superimposed on the plot such that a value of the timing offset $d_2$ is at the center of the window w. A length from the center of the window w to the farthest edge of the MS1 time zone is $t_2$, wherein $t_2$ is at or within an edge of the window w. Accordingly, an overall delay spread S observed by MS1 is given by S=max {$t_2$, $S_a$, $S_b$}. Hence, S is equal to $t_2$, which is equal to CP in FIG. 8B. Moreover, because the time zones for mobile stations MS3 and MS4 are entirely within the edges of the window w, it is determined that MS3 and MS4 can be scheduled together with MS1.

In the example shown in FIG. 8C, a window w is superimposed on the plot such that a value of the timing offset $d_3$ is at the center of the window w. A length from the center of the window w to the farthest edge of the MS1 time zone is either $t_3$ or $t_4$, wherein $t_3$ and $t_4$ are within an edge of the window w. Accordingly, an overall delay spread S observed by MS1 is given by S=max {$t_3$, $t_4$, $S_a$, $S_b$}. Hence, S is less than or equal to CP in FIG. 8C. Moreover, because the time zones for mobile stations MS2, MS3 and MS4 are entirely within the edges of the window w, it is determined that MS2, MS3 and MS4 can be scheduled together with MS1.

In accordance with the embodiments described above, a base station controller can adjust the size of CP and timing offset d to satisfy a scheduling decision based on Quality of Service (QoS) constraints. For example, MS1, MS2, MS3 and MS4 have urgent data which must be sent immediately together in the next OFDM symbol. Referring to FIG. 8C, a minimum window can be placed ranging from the left edge of the MS4 time zone, to the right edge of the MS2 time zone, such that all four time zones (MS1, MS2, MS3 and MS4) are within the window. The timing adjustment can be decided as the center of the window. The CP length used in the transmission can be decided as CP=max {W/2, $S_a$, $S_b$ of MS1 to 4}.

In accordance with the embodiments described above, a base station controller may be configured to control delay in a wireless communication system by transmitting at least one signal to several mobile stations such that the signals are transmitted from at least two base stations, respectively. The controller may receive a report from each mobile station. The report, in one embodiment, includes data related to measured signal delay of the two base stations transmitting a signal to a respective mobile station, for example.

Desirably, the controller determines a time zone for each mobile station based on the received reports. The controller may also determine a cyclic prefix length and a timing offset between the two base stations based on the received reports. Depending on implementation, a report may include one or more of the following parameters: a delay spread of a first base station ($S_a$) or a second base station ($S_b$); a difference between an endpoint of the first base station's delay spread and a start point of the second base station's delay spread (x); a difference between a start point of the first base station's delay spread and an endpoint of the second base station's delay spread (y); a difference between a start point of the first base station's delay spread and a start point of the second base station's delay spread; and a difference between an endpoint of the first base station's delay spread and an endpoint of the second base station's delay spread.

Based on the above parameters, the controller selects a set of mobile stations that may be served simultaneously by the two base stations according to the time zone of each mobile station, the determined cyclic prefix length and the timing offset between the two base stations, for example. In one embodiment, the controller may adjust the cyclic prefix length of a signal transmitted to the set of mobile stations in order to simultaneously serve the set of mobile stations by way of the two base stations. In another embodiment, the controller may adjust the timing offset between the two base stations in order to simultaneously serve the set of mobile stations by way of the two base stations.

A time zone may include a duration beginning from a difference between an endpoint of the first base station's delay spread and a start point of the second base station's delay spread, to a difference between a start point of the first base station's delay spread and an endpoint of the second base station's delay spread. Alternatively, a time zone may include a duration beginning from a difference between a start point of the first base station's delay spread and an endpoint of the second base station's delay spread to a difference between an endpoint of the first base station's delay spread and a start point of the second base station's delay spread.

Figure 9:
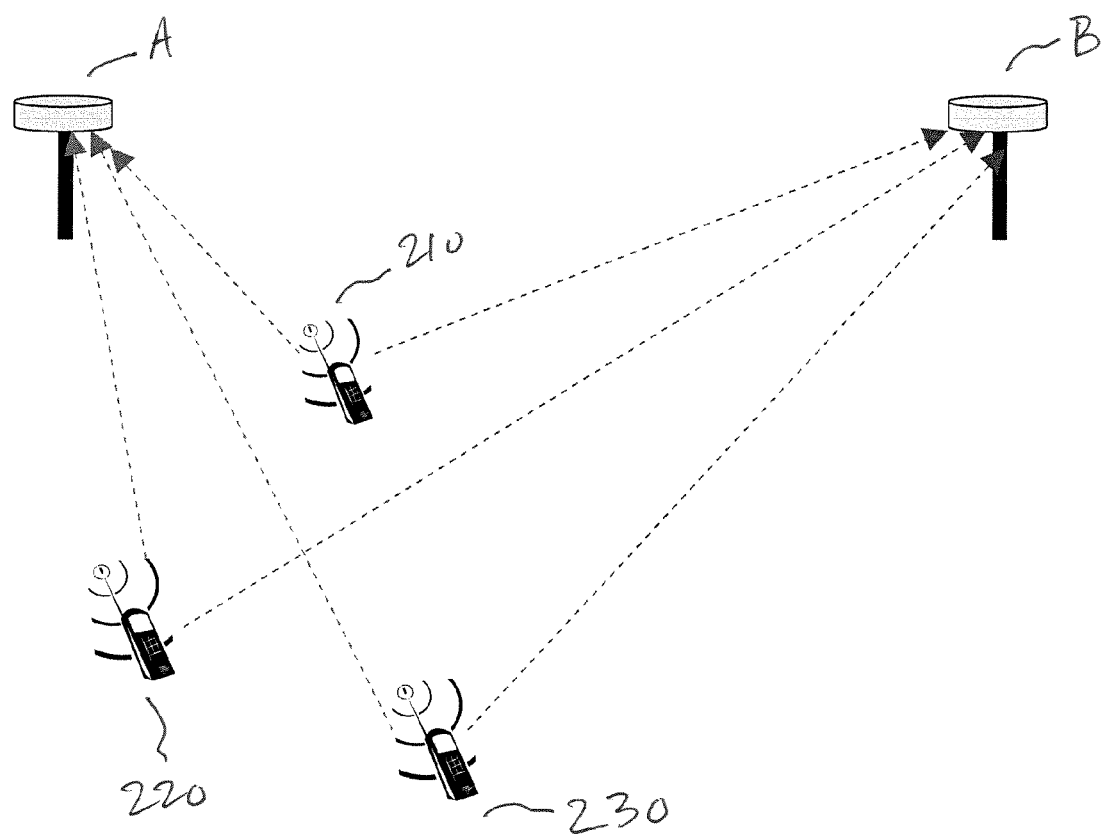
FIG. 9 illustrates an exemplary communication environment, in accordance with one embodiment, wherein a plurality of base stations are in communication with a plurality of mobile stations over reverse link (RL) channels.

Referring to FIG. 9, in accordance with another embodiment, a plurality of mobile stations 210, 220, 230 may communicate with a plurality of base stations A and B, over a RL channel. One or more of the mobile stations 210, 220 or 230 may receive a timing adjustment command from a base station A or B for adjusting a transmission time for a signal to be transmitted to the base stations A or B. Each mobile station, in response to receiving the timing adjustment command, may adjust the transmission time of the signal to be transmitted and transmit the signal to a base station A or B such that the signal is received by the base station synchronously. Adjusting the transmission time of the signal may involve advancing the transmission time of the signal or alternatively delaying the transmission time of the signal.

For example, a mobile station 210 may communicate over the RL channel with one or more base stations or sectors in a wireless communications network. The base stations may use the received pilot strengths from a mobile station at different sectors to determine the best RL serving sector (e.g., the best RL serving base station) for a mobile station 210. Mobile stations with different RL serving sectors may be assigned to tones in different sets. For example, the tones in a sector associated with a base station A do not neighbor those in a sector associated with a base station B.

In one embodiment, the RL serving sector depends on the feedback from one or more mobile stations 210, 220, 230 or on the RL signals to determine the propagation delays and spreads of the signals received from the served mobile stations. The RL serving sector issues timing adjustment commands to the served mobile station, such that the OFDM symbols transmitted from the mobile stations are received at about the same time by the serving sector. Depending on implementation, the timing adjustment command can be issued in the beginning, or the in the middle of a connection as the propagation delay and /or multipath delay profile of a mobile station changes.

In one or more embodiments, a base station A may advance the timing of a mobile station 210 transmission at call set-up (i.e., initiation of a communication connection). Certain embodiments may be configured to advance the timing of the transmission either at call set-up or during a call. Further, certain other embodiments may be configured to provide for timing advances and timing delays. The timing information may be sent on an as needed basis as the mobile station propagation delay changes as monitored by the base station on the RL channel.

Depending on implementation, the timing adjustment command can be in the form of a Layer 3 signaling message or a MAC layer assignment block (e.g., an access grant command). As noted, the timing adjustment may specify either timing advance or delay adjustments. In some embodiments, the timing adjustment information is sent as a separate command. For example, in Ultra Mobile Broadband (UMB), the timing adjust assignment block may be transmitted over a forward control channel (e.g., F-SCCH). In one embodiment, the MAC ID field may be removed so that additional information may be sent to the mobile station. Alternatively, bits associated with the MAC ID can be used as reserved bits for future use.

The MAC layer assignment block may be transmitted by the base station A upon detection of an access sequence, or during the connection to adjust the timing of RL transmissions. A MACID field may be included in the MAC layer assignment block. The MACID, in the case of initial access, is set to the new MACID that the sector is assigning to the mobile station 210. In the case of special access, the MACID is set to the MACID that is already assigned to the mobile station 210 by a serving sector.

The assignment block may be scrambled with an access sequence ID used by the mobile station 210 during transmission of the associated access sequence for acknowledging an access probe, or scrambled with the MACID of the mobile station to which the block is sent for timing adjustment. The access sequence ID is determined by the AC MAC protocol and may be found in the public data of that protocol. The scrambling procedure may be defined in the physical layer. The timing field that is part of the assignment block may be used to inform the mobile station 210 of the timing offset to be applied to subsequent RL transmissions.

In one embodiment, the mobile station 210 may offset (e.g., advance or delay) its transmission timing by the following values, where a positive value indicates an advance and a negative value indicates a delay adjustment:

offset=Timing[7:0]*NFFT/128 chips if the block is scrambled by an access sequence ID.

offset=−1*Timing[7:7]*Timing[6:0]*NFFT/128 chips if the block is scrambled by the MACID of the station.

In certain embodiments, the timing adjustment information may be sent by reusing an existing command. Desirably, the timing adjust command may be sent by reusing the MAC layer assignment block. In UMB, for example, MAC layer assignment block of a forward channel (e.g., F-SCCH) may be reused. Accordingly, the timing adjustment command may be used in response to a mobile station access probe during a hand-off (asynchronous mode) or during call set-up; and for purely re-adjusting the mobile station's timing even in the absence of the mobile station access probe.

The above approach, allows the timing adjust command to adjust the timing not only for advancing the mobile station timing but also for delaying the mobile station timing. The MAC layer assignment block, in some embodiments, uses 8 bits for advancing the mobile station timing. In other embodiments, the timing adjust commands may use different number of bits. For example, 9 bits may be used, where one of the bits is used to indicate whether the timing adjust value is negative or positive; or 8 bits may be used to indicate the polarity (i.e., negative or positive value) of the timing adjust value and use the remaining 7 bits for the magnitude of the timing adjust value. Alternative, the MAC ID field may be removed if it is redundant during a call connection state.

In some embodiments, the extra bits are used to provide timing adjustment information. The timing adjustment information may be transmitted along with the RL assignment block (RLAB) either as an absolute adjustment or a relative adjustment. Alternatively, a new Layer 3 parameter (e.g., a timing adjust parameter) may be sent to a mobile station on an as needed basis using an in-band signaling approach. In certain embodiment, a zero padding (ZP) scheme may be implemented. For example, ZP can be adaptive depending on the delay spread. The ZP size may be controlled, for example, by using affirmative acknowledgements (e.g., ACK/NAK), such that ZP is reduced, when an ACK is received. ZP is increased when a NAK is received.

In accordance with one embodiment, a uniform and conservative CP length may be used by mobile stations to produce OFDM symbols. If the OFDM symbols from different mobile stations arrive at the serving base station within a window shorter than CP, the base station may use more samples as the data portion to demodulate the signals. If the OFDM symbols from different mobile stations arrive at the serving base station within CP, the base station uses the default length of the data portion to demodulate the signals. As noted earlier, the mobile stations controlled by a base station A and mobile stations controlled by a base station B can be configured so as not to use neighboring tones. Advantageously, the serving base station may have more received energy per symbol.

Figure 10:
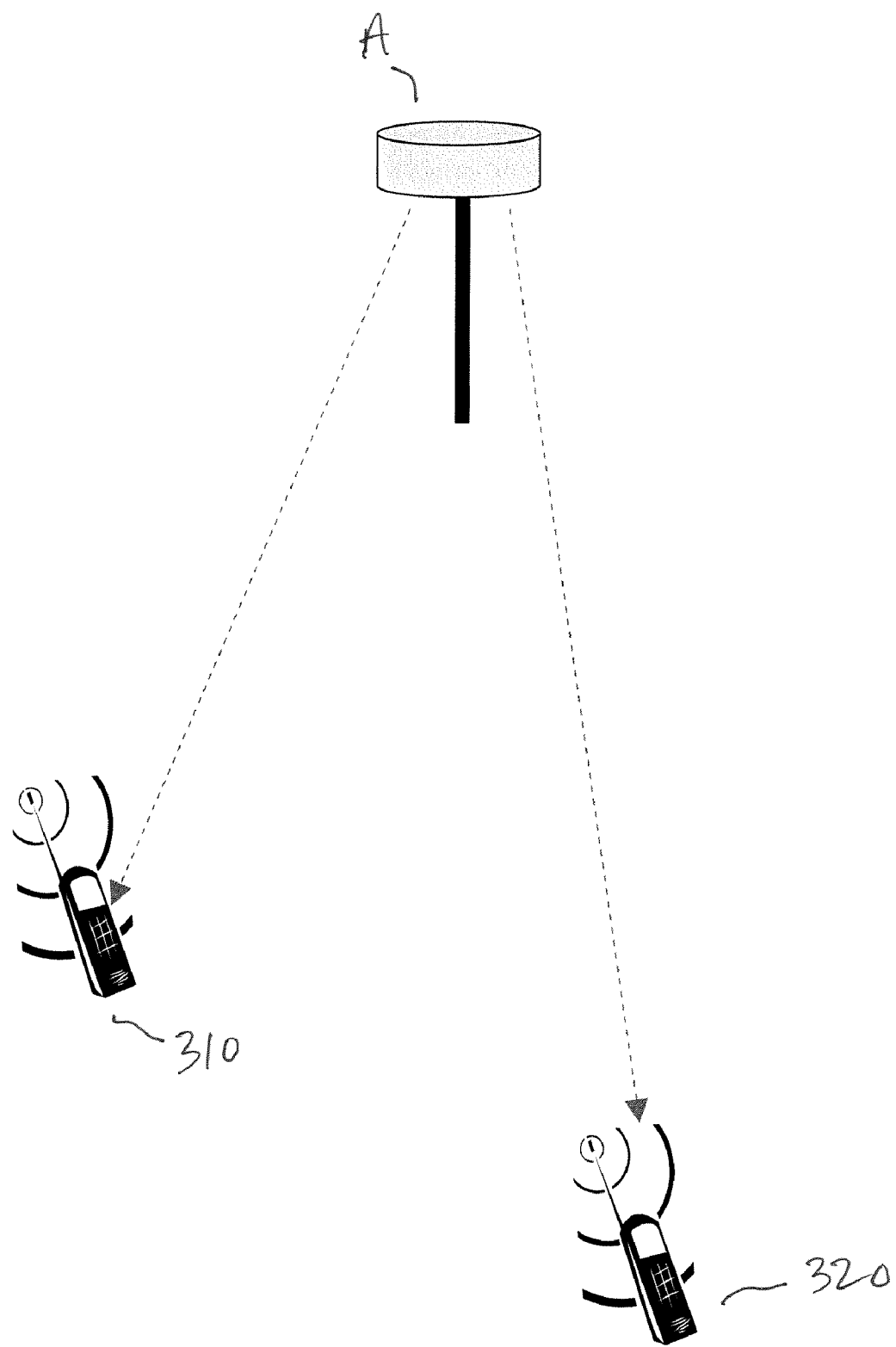
FIGS. 10 and 11 illustrate exemplary mobile communication environments, in accordance with one embodiment, in which a base station is in communication with one or more mobile stations over the FL channel, with different mobiles allocated a subset of tones.

Referring to FIG. 10, an exemplary mobile communication network is illustrated in which a base station A is in communication with one or more mobile stations 310, 320 over the FL channel, with different mobile stations allocated to a subset of tones. In the illustrated environment, each mobile station 310, 320 may receive a signal from a base station A, and measure at least one signal delay for the base station A. Each mobile station 310, 320 may report the signal delay to the base station A and in response receive an adjusted signal from the base station A. The signal may be adjusted with a conservative cyclic prefix chosen by the base station A according to the measured signal delay from the mobile stations 310, 320 waiting for data to be received in the adjusted signal.

In some embodiments, only the mobile stations 310, 320 receiving data are considered. Assuming that OFDM is used in FL channel communication with different mobile stations 310, 320 allocated a subset of tones, each mobile station listens to a single data source. In one embodiment, a mobile station 310 or 320 reports an experienced delay spread to the network (e.g., base station A). In response, the network produces OFDM symbols using a conservative CP on desirably all tones, and notifies the served mobile stations of the conservative CP. The mobile station takes the reported delay spread as CP, which is not used for demodulation. That is, a mobile station with a low delay spread can have more samples (samples in the duration of {conservative CP−reported CP}) per symbol to increase the received energy.

Base station A takes into account the reported delay spread to decide power and modulation coding scheme for each mobile 310, 320. Advantageously, base station A may use the delay information provided by the mobile station 310, 320 to intelligently allocate its power to optimize the sector throughput, or to enhance the fairness among the mobile station served in that sector.

Figure 11:
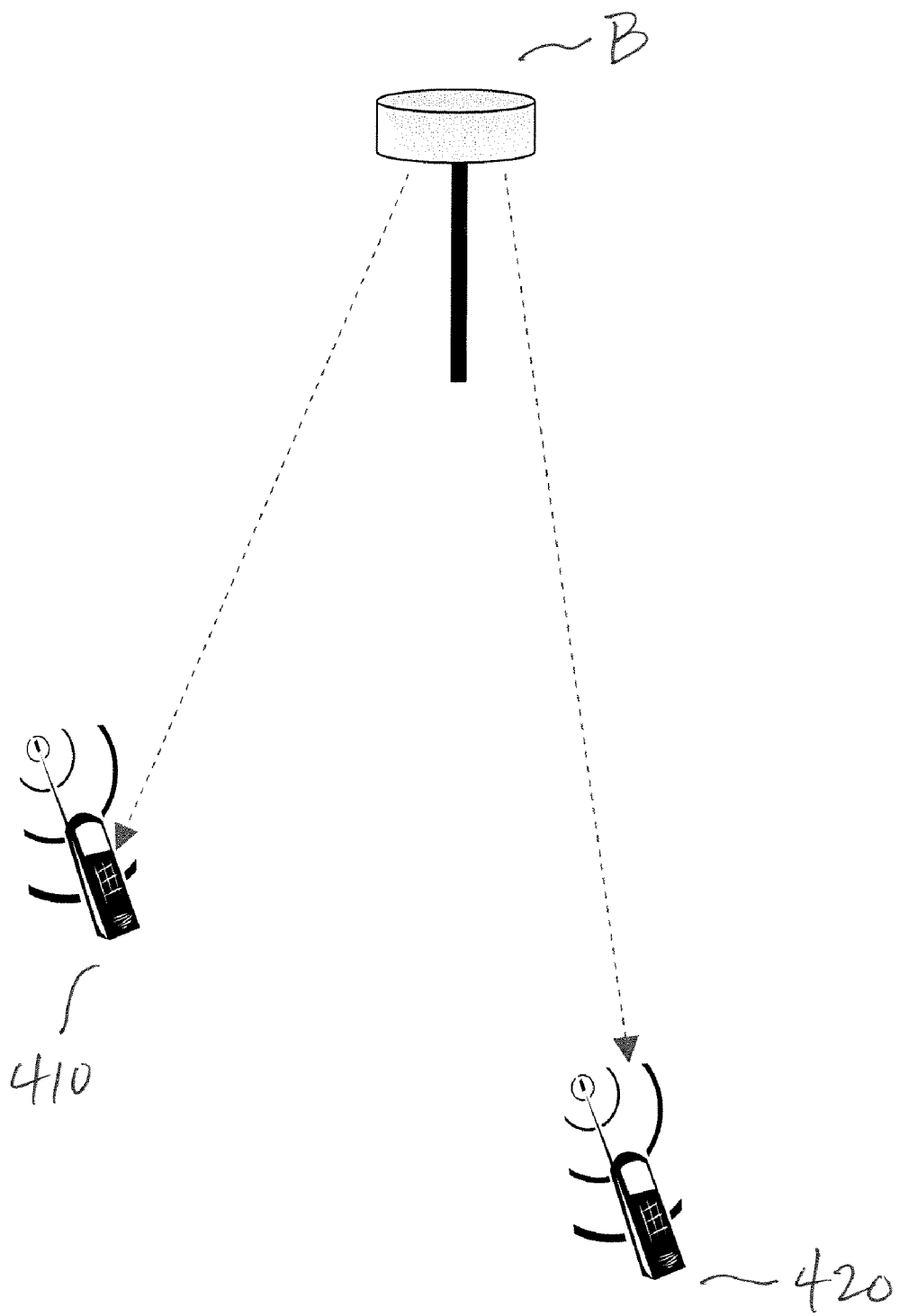

Referring to FIG. 11, a base station B is illustrated communicating over the FL with one or more mobile stations 410, 420, using OFDM and TDM. In accordance with one embodiment, a mobile station 410, 420 is allocated to preferably all tones at a time. In some embodiments, the base station B may determine its CP length based on the delay spread of the received signals as applicable to a TDD system. Further, an offset can be used to allow the base station B to adjust for differences in the forward link and reverse link delay spread values.

In an exemplary embodiment, OFDM and TDM may be used over FL channel, with a mobile station 410, for example, allocated all tones at a time, so that the mobile station 410 listens to a single data source (e.g., base station B). Mobile station 410 reports the experienced delay spread to the base station B, or the base station B determines the delay spread bases on the delay spread of the signals received from mobile station 410.

In one embodiment, the mobile station 410 takes the reported delay spread as CP. That is, a mobile station with a low delay spread can have more samples per symbol to increase the received energy, or a shorter symbol duration. The network or the base station may take into account the reported delay spread to decide modulation, coding scheme, or the required symbol duration for each mobile. In the case that Zero Prefix (silent) is used instead of CP, if the symbol duration is kept the same, the ZP can be reduced, with longer data duration, when the delay spread is shorter.

Accordingly, the delay information fed back from the mobile station may be utilized to adjust the data rate to the mobile stations through adjustment of modulation or symbol length. Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Figure 12:
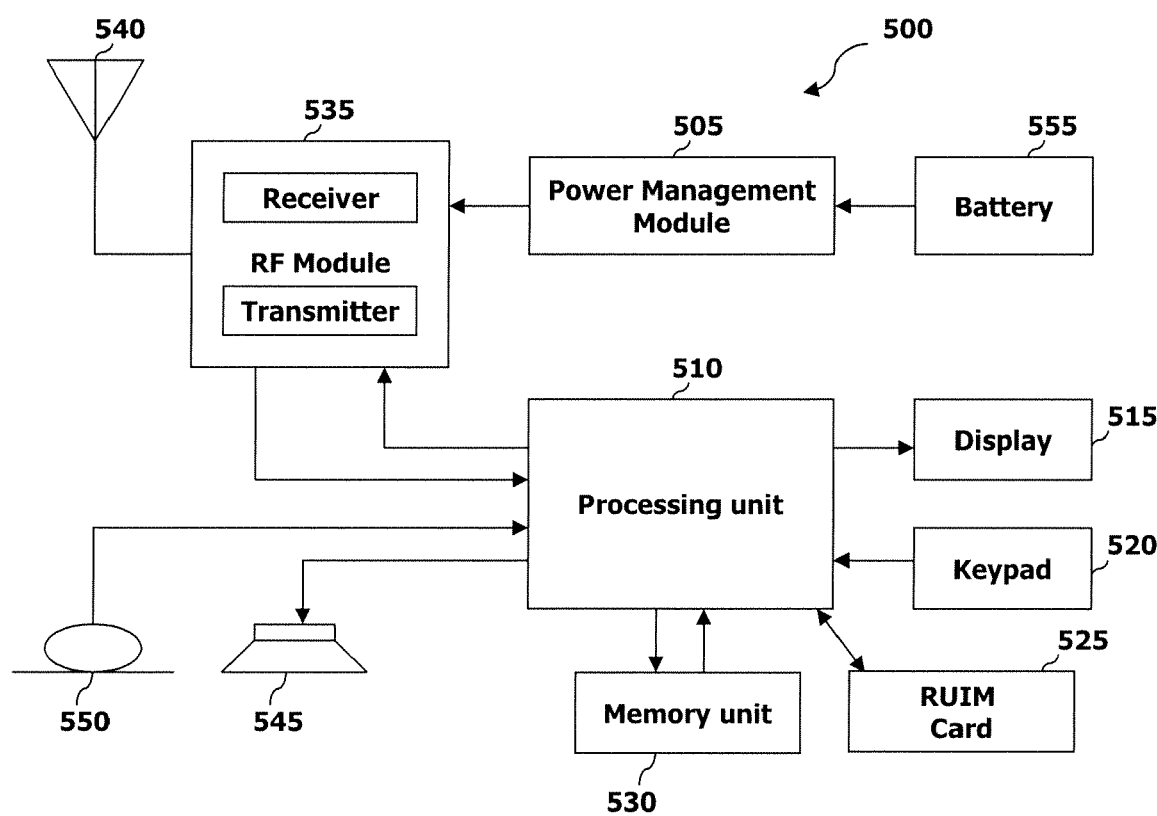
FIG. 12 is a block diagram of mobile communication device, which may be configured as an AT in accordance with embodiments of the present invention.

FIG. 12 is a block diagram of mobile communication device 500, which may be configured as an AT in accordance with embodiments of the present invention. Device 500 is illustrated, for example, as a mobile phone and may be configured to perform various methods described herein. The mobile communication device 500 includes a processing unit 510 such as a microprocessor or digital signal processor, RF module 535, power management module 505, antenna 540, battery 555, display 515, keypad 520, optional removable user identity module (RUIM) card 525, memory unit 530 such as flash memory, ROM or SRAM, speaker 545 and microphone 550.

A user enters instructional information, such as a telephone number, for example, by pushing the buttons of keypad 520 or by voice activation using microphone 550. Processing unit 510 receives and processes the instructional information to perform the appropriate function, such as to dial the telephone number. Operational data may be retrieved from memory unit 530 to perform the function. Furthermore, processing unit 510 may display the instructional and operational information on display 515 for the user's reference and convenience.

Processing unit 510 issues instructional information to RF section 535, to initiate communication, for example, transmit radio signals comprising voice communication data. RF section 535 comprises a receiver and a transmitter to receive and transmit radio signals. Antenna 540 facilitates the transmission and reception of radio signals. Upon receiving radio signals, RF module 535 may forward and convert the signals to baseband frequency for processing by processing unit 510. The processed signals would be transformed into audible or readable information outputted via speaker 545, for example.

Processing unit 510 is adapted to perform various methods disclosed herein, among other operation. It will be apparent to one skilled in the art that mobile communication device 500 may be readily implemented using, for example, processing unit 510 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMB. The present invention is also applicable to other wireless communication systems using different air interfaces and/or physical layers, for example, UMTS, TDMA, CDMA including 1xEV-DO, FDMA, WCDMA including HSDPA, HSUPA, and beyond, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling delay in a wireless communication system, the method comprising:
    transmitting at least one signal to a plurality of mobile stations, wherein the at least one signal is transmitted from two base stations, respectively;
    receiving a report from each of the plurality of mobile stations, wherein the report is related to at least one measured signal delay of the two base stations transmitting a signal to a respective mobile station;
    determining a time zone of each mobile station based on the received reports;
    determining a cyclic prefix length based on the received reports;
    determining a timing offset between the two base stations based on the received reports; and
    determining a set of mobile stations that can be served simultaneously by the two base stations according to the time zone of each mobile station, the determined cyclic prefix length and the timing offset between the two base stations.

2. The method of claim 1, further comprising adjusting the cyclic prefix length of a signal transmitted to the set of mobile stations in order to simultaneously serve the set of mobile stations by the two base stations.

3. The method of claim 1, wherein the report comprises at least three of the following parameters:
    a delay spread of a first base station;
    a delay spread of a second base station;
    a difference between an endpoint of the first base station's delay spread and a start point of the second base station's delay spread;
    a difference between a start point of the first base station's delay spread and an endpoint of the second base station's delay spread;
    a difference between a start point of the first base station's delay spread and a start point of the second base station's delay spread; and
    a difference between an endpoint of the first base station's delay spread and an endpoint of the second base station's delay spread.

4. The method of claim 3, wherein the time zone comprises a duration beginning from a difference between an endpoint of the first base station's delay spread and a start point of the second base station's delay spread, to a difference between a start point of the first base station's delay spread and an endpoint of the second base station's delay spread.

5. The method of claim 3, wherein the time zone comprises a duration beginning from a difference between a start point of the first base station's delay spread and an endpoint of the second base station's delay spread, to a difference between an endpoint of the first base station's delay spread and a start point of the second base station's delay spread.

6. A method for controlling delay in a wireless communication system, the method comprising:

receiving at least one signal from two base stations, wherein the two base stations transmit the at least one signal to a plurality of mobile stations;

measuring at least one signal delay of the two base stations;

reporting the measured at least one signal delay of the two base stations; and receiving an adjusted signal from one of the two base stations in response to the reporting of the measured at least one signal delay, determining, based on the reported measured at least one signal delay, a time zone of each of the plurality of mobile stations, a cyclic prefix length, and a timing offset between the two base stations; and determining a set of mobile stations that can be served simultaneously by the two base stations according to the determined time zone of each of the plurality of mobile stations, the determined cyclic prefix length and the determined timing offset.

7. The method of claim 6, wherein the adjusted signal is adjusted with a conservative cyclic prefix chosen by the one of the two base stations according to the measured at least one signal delay.

8. A network for controlling delay in a wireless communication system, the network comprising:

two base stations respectively transmitting at least one signal to a plurality of mobile stations and receiving a report from each of the plurality of mobile stations, wherein the report is related to at least one measured signal delay of the two base stations transmitting a signal to a respective mobile station; and a controller determining a time zone of each mobile station based on the received reports, determining a cyclic prefix length based on the received reports, determining a timing offset between the two base stations based on the received reports, and determining a set of mobile stations that can be served simultaneously by the two base stations according to the time zone of each mobile station, the determined cyclic prefix length and the timing offset between the two base stations.

* * * * *